US012687604B2

(12) United States Patent
Xie et al.

(10) Patent No.: US 12,687,604 B2
(45) Date of Patent: Jul. 21, 2026

(54) UNMANNED AERIAL VEHICLE AND LOCALIZATION METHOD FOR UNMANNED AERIAL VEHICLE

(71) Applicant: Nanyang Technological University, Singapore (SG)

(72) Inventors: Lihua Xie, Singapore (SG); Pham Nhat Thien Minh Nguyen, Singapore (SG); Muqing Cao, Singapore (SG); Shenghai Yuan, Singapore (SG)

(73) Assignee: Nanyang Technological University, Singapore (SG)

( * ) Notice: Subject to any disclaimer, the term of this patent is extended or adjusted under 35 U.S.C. 154(b) by 118 days.

(21) Appl. No.: 18/040,148

(22) PCT Filed: Aug. 26, 2021

(86) PCT No.: PCT/SG2021/050512
§ 371 (c)(1),
(2) Date: Feb. 1, 2023

(87) PCT Pub. No.: WO2022/045982
PCT Pub. Date: Mar. 3, 2022

(65) Prior Publication Data
US 2023/0314548 A1 Oct. 5, 2023

(30) Foreign Application Priority Data
Aug. 31, 2020 (SG) ............................ 10202008405P

(51) Int. Cl.
*G01S 5/02* (2010.01)
*B64U 10/14* (2023.01)
(Continued)

(52) U.S. Cl.
CPC ............ *G01S 5/0264* (2020.05); *B64U 10/14* (2023.01); *B64U 20/87* (2023.01); *G01S 5/14* (2013.01); *G01S 17/08* (2013.01); *B64U 2101/30* (2023.01)

(58) Field of Classification Search
CPC .... B64U 10/14; B64U 20/87; B64U 2101/30; B64U 2201/00; B64U 30/20;
(Continued)

(56) References Cited

U.S. PATENT DOCUMENTS 6,868,314 B1 * 3/2005 Frink ..................... B64U 20/70
244/119
9,056,676 B1 * 6/2015 Wang ........................ B60R 9/00
(Continued)

FOREIGN PATENT DOCUMENTS

CN 206202676 U 5/2017
CN 108303995 A 7/2018
(Continued)

OTHER PUBLICATIONS

Foreign Communication from a Related Counterpart Application, International Preliminary Report on Patentability dated Mar. 9, 2023, International Application No. PCT/SG2021/050512 filed on Aug. 26, 2021.
(Continued)

*Primary Examiner* — Babar Sarwar
(74) *Attorney, Agent, or Firm* — Conley Rose, P.C.

(57) ABSTRACT

An unmanned aerial vehicle aerial vehicle and a localization method for an unmanned aerial vehicle aerial vehicle are described. In an embodiment, an unmanned aerial vehicle comprises: a first ultra-wide band node; a second ultra-wide band node; and a localization processor configured to use signals received at the first ultra-wide band node and the second ultra-wide band node from a plurality of anchor
(Continued)

nodes located within an environment to estimate a pose state of the unmanned aerial vehicle, wherein the first ultra-wide band node and the second ultra-wide band node are arranged on the unmanned aerial vehicle at positions offset from one another.

20 Claims, 7 Drawing Sheets

(51) Int. Cl.
| | |
|---|---|
| *B64U 20/87* | (2023.01) |
| *B64U 101/30* | (2023.01) |
| *G01S 5/14* | (2006.01) |
| *G01S 17/08* | (2006.01) |

(58) Field of Classification Search
CPC ... G01C 21/1652; G01C 21/20; G01S 13/765; G01S 13/865; G01S 13/867; G01S 13/874; G01S 17/08; G01S 5/0264; G01S 5/14; G01S 7/006; G08G 5/0013; G08G 5/0026; G08G 5/0052; G08G 5/0069; H04B 7/18502
See application file for complete search history.

(56) References Cited

U.S. PATENT DOCUMENTS

| | | | | |
|---|---|---|---|---|
| 10,939,406 | B1 * | 3/2021 | Wu | G01S 5/0242 |
| 2008/0045235 | A1 * | 2/2008 | Kennedy | G01S 5/02521 |
| | | | | 455/456.1 |
| 2016/0259032 | A1 * | 9/2016 | Hehn | G05D 1/101 |
| 2016/0357193 | A1 * | 12/2016 | Bruemmer | G05D 1/106 |
| 2018/0244385 | A1 * | 8/2018 | Kim | B64U 50/34 |
| 2019/0227576 | A1 * | 7/2019 | High | G05D 1/0094 |
| 2019/0355145 | A1 * | 11/2019 | Bruner | H04W 4/38 |
| 2020/0043348 | A1 * | 2/2020 | Ghosh | G05D 1/101 |
| 2020/0245217 | A1 * | 7/2020 | Zhang | H04W 4/40 |
| 2020/0366335 | A1 * | 11/2020 | Lee | H04B 1/7163 |
| 2021/0012667 | A1 * | 1/2021 | Sabato | G08G 5/21 |

FOREIGN PATENT DOCUMENTS

| | | | | | |
|---|---|---|---|---|---|
| CN | | 111796315 | A * | 10/2020 | G01S 19/47 |
| WO | WO-2020219692 | A1 * | 10/2020 | H04W 64/006 |
| WO | | 2022045982 | A1 | 3/2022 | |

OTHER PUBLICATIONS

Foreign Communication from a Related Counterpart Application, International Search Report and Written Opinion dated Nov. 24, 2021, International Application No. PCT/SG2021/050512 filed on Aug. 26, 2021.

Nguyen, et al., "Integrated UWB-Vision Approach for Autonomous Docking of UAVs in GPS-denied Environments", 2019 International Conference on Robotics and Automation (ICRA), May 24, 2019, pp. 9603-9609 [Retrieved on Nov. 19, 2021], DOI: 10.1109/ICRA.2019.8793851.

Balderas, et al., "Low-Profile Conformal UWB Antenna for UAV Applications", IEEE Access, Sep. 4, 2019, vol. 7, pp. 127486-127494 [Retrieved on Nov. 19, 2021], DOI: 10.1109/ACCESS.2019.2939511.

Mueller, et al., "Fusing ultra-wideband range measurements with accelerometers and rate gyroscopes for quadrocopter state estimation," 2015 IEEE International Conference on Robotics and Automation (ICRA), Washington State Convention Center, Seattle, Washington, May 26-30, 2015, 7 pages.

Nguyen, et al., "An Ultra-Wideband-based Multi-UAV Localization System in GPS-denied environments", International Micro Air Vehicle Competition and Conference 2016, Beijing, PR of China, Oct. 17-21, 2016, 6 pages.

Song, et al., "UWB/LiDAR Fusion For Cooperative Range-Only SLAM", 2019 International Conference on Robotics and Automation (ICRA), Palais des congres de Montreal, Montreal, Canada, May 20-24, 2019, 7 pages.

Wang, et al., "Ultra-Wideband Aided Fast Localization and Mapping System", 2017 IEEE/RSJ International Conference on Intelligent Robots and Systems (IROS), Vancouver, BC, Canada, Sep. 24-28, 2017, 8 pages.

Queralta, et al., "VIO-UWB-Based Collaborative Localization and Dense Scene Reconstruction within Heterogeneous Multi-Robot Systems", arXiv 2020. arXiv preprint arXiv:2011.00830, Apr. 10, 2022, 7 pages.

* cited by examiner

| | Req. ID | Res. ID | PII | Chan. | Ant. Mode | Req. Data | Rsp. Data | Type | Sleep | Man. Time (ms) | Min. Time (ms) |
|---|---|---|---|---|---|---|---|---|---|---|---|
| 0 | 100 | 101 | 7 | 0 | Ant. A | 0 | 0 | Range | 0 | 25 | 24.691 |
| 1 | 201 | 101 | 7 | 1 | Ant. A | 0 | 0 | Range | 0 | 25 | 24.457 |
| 2 | 200 | 101 | 7 | 0 | Ant. A | 0 | 0 | Range | 0 | 25 | 24.691 |
| 3 | 202 | 101 | 7 | 2 | Ant. A | 0 | 0 | Range | 0 | 25 | 24.227 |
| 4 | 201 | 101 | 7 | 1 | Ant. A | 0 | 0 | Range | 0 | 25 | 24.457 |
| 5 | 200 | 101 | 7 | 0 | Ant. A | 0 | 0 | Range | 0 | 25 | 24.691 |
| 6 | 202 | 101 | 7 | 2 | Ant. A | 0 | 0 | Range | 0 | 25 | 24.227 |
| 7 | 101 | 102 | 7 | 0 | Ant. A | 0 | 0 | Range | 0 | 25 | 24.691 |
| 8 | 201 | 101 | 7 | 1 | Ant. A | 0 | 0 | Range | 0 | 25 | 24.457 |
| 9 | 200 | 101 | 7 | 0 | Ant. A | 0 | 0 | Range | 0 | 25 | 24.691 |
| 10 | 202 | 101 | 7 | 2 | Ant. A | 0 | 0 | Range | 0 | 25 | 24.227 |
| 11 | 201 | 101 | 7 | 1 | Ant. A | 0 | 0 | Range | 0 | 25 | 24.457 |
| 12 | 200 | 101 | 7 | 0 | Ant. A | 0 | 0 | Range | 0 | 25 | 24.691 |
| 13 | 202 | 101 | 7 | 2 | Ant. A | 0 | 0 | Range | 0 | 25 | 24.227 |
| 14 | 102 | 101 | 7 | 0 | Ant. A | 0 | 0 | Range | 0 | 25 | 24.691 |
| 15 | 201 | 101 | 7 | 1 | Ant. A | 0 | 0 | Range | 0 | 25 | 24.457 |
| 16 | 200 | 101 | 7 | 0 | Ant. A | 0 | 0 | Range | 0 | 25 | 24.691 |
| 17 | 202 | 101 | 7 | 2 | Ant. A | 0 | 0 | Range | 0 | 25 | 24.227 |
| 18 | 201 | 101 | 7 | 1 | Ant. A | 0 | 0 | Range | 0 | 25 | 24.457 |
| 19 | 200 | 101 | 7 | 0 | Ant. A | 0 | 0 | Range | 0 | 25 | 24.691 |
| 20 | 202 | 101 | 7 | 2 | Ant. A | 0 | 0 | Range | 0 | 25 | 24.227 |

500

Receive signals from ultra-
wide band anchor nodes —— 502

↓

Estimate pose state of
unmanned aerial vehicle —— 504

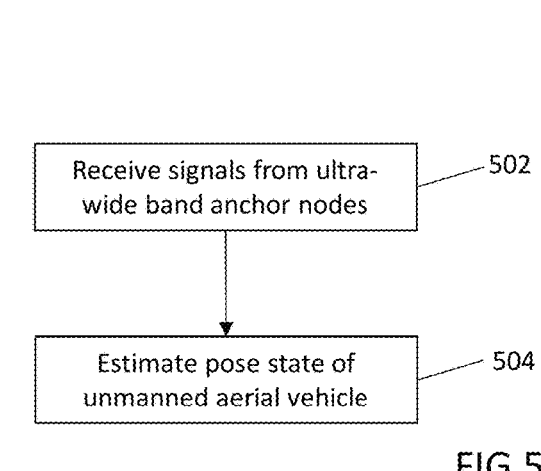

Anchor to UAV measurements    603

Anchors'
positions    604       602

605

Anchor Self-
localization     UWB RANGING & COMMUNICATION

IMU-
propagated
state   629

610   UWB Data  →  Preliminary Checks  →  Bundling  →  Outlier check 614     616

612        624        628

620   IMU Data  →  Bundling  →  Preintegration   $\mathcal{I}_m$   $\{\mathcal{U}_m^i\}$   Pose Prediction 622    632     634      626

630   Pointclouds  →  Feature Extraction  →  Transform & Deskew  →  Local Optimization   $\hat{X}_k$

640

$\{\mathcal{U}_m^i\}$  ··· ···   Key frame management  →  Local Map  →  Association   $\{\mathcal{L}_m^i\}$ $\hat{X}_m$       642      644

650   Images  →  Feature Extraction Sync.  →  Triangulation   $\{\mathcal{V}_{ab}^i\}$ 652     654

FIG.6

| Dataset | VINS-Mono (right camera, odom/BA) | VINS-Fusion (both cameras, odom/BA) | A-LOAM (horz. / vert.) | LIO-SAM (horz.) | MLOAM (2 lidars) | VIRAL (horz. lidar) | VIRAL (2 lidars) |
|---|---|---|---|---|---|---|---|
| eee.01 | 1.651 / 0.569 | 0.586 / 0.327 | 0.224 / 5.713 | 0.091 | 0.380 | 0.083 | 0.089 |
| eee.02 | 0.747 / 0.469 | 0.575 / 0.217 | 0.189 / 2.244 | 0.080 | 0.202 | 0.084 | 0.084 |
| eee.03 | 1.037 / 0.886 | 0.582 / 0.467 | 0.152 / 4.380 | 0.118 | 0.278 | 0.057 | 0.045 |
| nya.01 | 1.775 / 1.090 | 0.398 / 0.234 | 0.080 / 0.803 | 0.090 | 0.145 | 0.060 | 0.045 |
| nya.02 | 0.580 / 0.481 | 0.424 / 0.298 | 0.093 / 0.378 | 0.107 | 0.235 | 0.061 | 0.069 |
| nya.03 | 1.333 / 0.514 | 0.786 / 0.390 | 0.084 / 0.683 | 0.360 | 0.283 | 0.053 | 0.037 |
| sbs.01 | 4.081 / 3.686 | 0.507 / 0.372 | 0.195 / 6.452 | 0.094 | 0.188 | 0.068 | 0.070 |
| sbs.02 | 1.607 / 0.891 | 0.563 / 0.369 | 0.087 / 2.816 | 0.096 | 0.177 | 0.068 | 0.078 |
| sbs.03 | 1.306 / 0.802 | 0.841 / 0.295 | 0.346 / 4.732 | 0.103 | 0.182 | 0.071 | 0.070 |

| Test | Anchor 0 coordinates [m] | | | Anchor 1 coordinates [m] | | | Anchor 2 coordinates [m] | | |
|---|---|---|---|---|---|---|---|---|---|
| | X | Y | Z | X | Y | Z | X | Y | Z |
| bid_01 | 0.0 | 0.0 | 1.0 | 61.55 | 0.0 | 1.0 | 24.14 | -14.15 | 1.0 |
| bid_02 | 0.0 | 0.0 | 1.0 | 39.53 | 0.0 | 1.0 | 14.28 | -9.92 | 1.0 |
| bid_03 | 0.0 | 0.0 | 1.0 | 44.98 | 0.0 | 1.0 | 28.46 | -9.97 | 1.0 |

FIG.11

| Dataset | VINS-Mono (right camera, odom/BA) | VINS-Fusion (both cameras, odom/BA) | A-LOAM (horz. / vert.) | LIO-SAM (horz.) | MLOAM (2 lidars) | VIRAL (horz. lidar) | VIRAL (2 lidars) |
|---|---|---|---|---|---|---|---|
| bid.01 | 3.731 / 3.613 | 2.416 / 2.077 | 1.022 / 12.844 | - | 4.265 | 0.180 | 0.163 |
| bid.02 | 1.256 / 1.241 | 0.837 / 0.625 | 5.713 / 4.317 | - | 0.267 | 0.564 | 0.343 |
| bid.03 | 0.670 / 0.659 | 0.925 / 0.824 | 3.084 / 1.682 | - | 3.331 | 1.626 | 0.129 |

FIG.12

UNMANNED AERIAL VEHICLE AND LOCALIZATION METHOD FOR UNMANNED AERIAL VEHICLE

CROSS-REFERENCE TO RELATED APPLICATIONS

The present application is a filing under 35 U.S.C. 371 as the National Stage of International Application No. PCT/SG2021/050512, filed Aug. 26, 2021, entitled "UNMANNED AERIAL VEHICLE AND LOCALIZATION METHOD FOR UNMANNED AERIAL VEHICLE," which claims priority to Singapore Application No. SG 10202008405P filed with the Intellectual Property Office of Singapore on Aug. 31, 2020, both of which are incorporated herein by reference in their entirety for all purposes.

TECHNICAL FIELD

The present disclosure relates to unmanned aerial vehicles and in particular to localization of unmanned aerial vehicles.

BACKGROUND

Robust and reliable state estimation is undoubtedly one of the most crucial tasks for development of unmanned aerial vehicles (UAVs). There are two main approaches to localization of UAVs that are usually employed, depending on the scenario in which the UAV is applied.

The first approach is the so-called onboard self-localization (OSL) approach, in which a variety of methods based on visual-inertial odometry (VIO) or Lidar Odometry and Mapping (LOAM) techniques are employed. These techniques have become ubiquitous now due to their flexibility and effectiveness. However, the main characteristics of these methods is that while they have high accuracy in the short term, they can suffer from accumulated error in the long term.

The second approach is the so-called Infrastructure-based localization (ISL) approach in which the UAV can rely on fixed anchors installed in the environment to localize itself with respect to a fixed coordinate system. This approach will ensure that the positioning information will not drift in long term as in OSL methods, which is desired in a great number of applications as a user often seeks to have the UAV perform a predefined trajectory to cover an area, inspect an object, or coordinated large-scale performance. However, the installation of the anchors also incurs additional costs, deployment effort, and maintenance responsibility.

SUMMARY

According to a first aspect of the present disclosure, an unmanned aerial vehicle is provided. The unmanned aerial vehicle comprises: a first ultra-wide band node; a second ultra-wide band node; and a localization processor configured to use signals received at the first ultra-wide band node and the second ultra-wide band node from a plurality of anchor nodes located within an environment to estimate a pose state of the unmanned aerial vehicle, wherein the first ultra-wide band node and the second ultra-wide band node are arranged on the unmanned aerial vehicle at positions offset from one another.

The unmanned aerial vehicle has a body-offset configuration of ultra-wide band (UWB) nodes. This configuration is employed to achieve direct coupling of the UAV's orientation in the range measurements. This configuration also allows a simple and efficient scheme to be developed for deployment of a network of UWB nodes in the field with minimal time and effort. The use of a few UWBs that can be quickly and effortlessly deployed allows user to define a global coordinates system that aligns well with the object or structure to be inspected on site, thus avoiding misalignment between the pre-defined trajectory optimized in the path planning simulation with the real object in the actual site. After the deployment, the network can automatically calculate the position of the ground nodes by using ranging and communication capabilities of UWB radio modules. The use of the body-offset ranging ensures that the orientation of the UAV will not drift as with OSL methods and conventional UWB-based localization system.

In an embodiment, the UAV further comprises an inertial measurement unit configured to detect linear acceleration and angular velocity of the unmanned aerial vehicle and wherein the localization processor is further configured to use measurements from the inertial measurement unit to predict the pose state of the unmanned aerial vehicle.

In an embodiment, the localization processor is further configured to pre-integrate the measurements from the inertial measurement unit to obtain a set of pre-integrated inertial measurement unit measurements and to use the set of pre-integrated inertial movement unit measurements to estimate the pose state of the unmanned aerial vehicle. Mathematical models have been developed for ranging and pre-integration observations that couple the UWS and IMU measurements with the state estimates. The use of IMU pre-integration and VIO/LOAM observations can increase the efficiency and robustness of the method.

In an embodiment, the localization processor is further configured to compare a predicted distance calculated from the pose state of the unmanned aerial vehicle determined from the inertial measurement measurements with distance predictions determined from measurements by the first ultra-wideband node and the second ultra-wideband node and thereby identify outliners in the measurements by the first ultra-wideband node and the second ultra-wideband node.

Thus, the approach is robust to outliers. On one hand, the outliers can be effectively detected and rejected by its contribution in the cost function, on the other hand, the effect of a wrongly-admitted outlier can be mitigated by the presence of the overwhelming number of inliers, and the estimation can quickly return to the true value. In contrast, in filter-based methods, there is no straightforward way to do this as all information we have is the previous estimate, and the wrong admission of an outlier can lead to catastrophic effect, causing the system to diverge without any mechanism to reset.

In an embodiment, the UAV further comprises an on-board self-localization module configured to generate on-board self-localization data. The on-board self-localization module may comprise a lidar sensor and the on-board self-localization data comprises laser scan data and/or a camera and the on-board self-localization data comprises image data. Such embodiments provide for comprehensive localization approach that can fuse IMU, UWB and OSL (VIO/LOAM) information to achieve accurate and non-drifting estimation of a UAVs extended state. The sensor fusion framework can be easily adjusted to integrate any number of VIO or LOAM sources. Thus, increasing the level of redundancy and reliability of the localization method employed by the UAV can be achieved.

In an embodiment, the localization processor is further configured to estimate the pose state of the unmanned aerial vehicle using measurement data comprising measurements by the first ultra-wideband node and the second ultra-wideband node, the measurements from the inertial measurement unit and the on-board self-localization data by minimizing a cost function between the measurement data and a model predicted pose state.

In an embodiment, the on-board self-localization module comprises a lidar sensor and the on-board self-localization data comprises laser scan data and the localization processor is further configured to use the on-board self-localization data to extract lidar features from the laser scan data and match the lidar features with a local map to obtain a set of feature-map-matching coefficients, wherein the cost function depends on the set of feature-map-matching coefficients.

In an embodiment, the on-board self-localization module comprises a camera and the on-board self-localization data comprises image data and localization processor is further configured to use the on-board self-localization data to extract a set of visual features from image data, wherein the cost function depends on the set of visual features.

In an embodiment, the localization processor is further configured to estimate the pose state of the unmanned aerial vehicle using measurement data corresponding to a sliding time window. Mathematical models are developed of OSL observations, i.e. lidar and visual features, from VIO and LOAM systems, which couple multiple poses of the state vectors in the sliding window.

Further, the ranging, pre-integration, OSL observations over the whole sliding window are combined together to construct a single cost function, which is then minimized via a search-and-optimize strategy to obtain the optimal values for the state estimates.

Thus, embodiments of the present disclosure provide a way to effectively combine the advantages of the aforementioned two approaches. Specifically, the short-term accuracy and reliability of OSL techniques is preserved, while also ensuring the that the localization is continuous, does not drift and is aligned well with the chosen frame of reference in the long-term as with infrastructure-based methods. Moreover, while the system can be assisted by the installation of the beacons, is does not incur too much cost in installation and starting up in field operations since fewer beacons may be required due to the provision of more than one UWB node on the UAV.

It is envisaged that such a system will find many applications in inspection of various structures (building, cranes, warehouse . . . ), area coverage, or multi-UAV performance.

According to a second aspect of the present disclosure a localization method for an unmanned aerial vehicle is provided. The unmanned aerial vehicle comprises: a first ultra-wide band node; and a second ultra-wide band node, wherein the first ultra-wide band node and the second ultra-wide band node are arranged on the unmanned aerial vehicle at positions offset from one another. The method comprises: using signals received at the first ultra-wideband node and the second ultra-wideband node from a plurality of anchor nodes located within an environment to estimate a pose state of the unmanned aerial vehicle.

In an embodiment, the unmanned aerial vehicle further comprises: an inertial measurement unit configured to detect linear acceleration and angular velocity of the unmanned aerial vehicle, and the method further comprises using measurements from the inertial measurement unit to predict the pose state of the unmanned aerial vehicle.

In an embodiment, the method further comprises pre-integrating the measurements from the inertial measurement unit to obtain a set of pre-integrated inertial measurement unit measurements and using the set of pre-integrated inertial measurement unit measurements to estimate the pose state of the unmanned aerial vehicle.

In an embodiment; the method further comprises comparing the predicted distance from the pose prediction of the unmanned aerial vehicle determined from measurements from the inertial measurement unit with the distance measurements by the first ultra-wideband node and the second ultra-wideband node and thereby identify outliners in the measurements by the first ultra-wideband node and the second ultra-wideband node.

In an embodiment, the method further comprises comprising receiving on-board self-localization data generated by on-board self-localization module of the unmanned aerial vehicle.

In an embodiment, the on-board self-localization module comprises a lidar sensor and the on-board self-localization data comprises laser scan data.

In an embodiment, the on-board Self-localization module comprises a camera and the on-board self-localization data comprises image data.

In an embodiment, the method further comprises estimating the pose state of the unmanned aerial vehicle using measurement data comprising measurements by the first ultra-wideband node and the second ultra-wideband node, the measurements from the inertial measurement unit and the on-board self-localization data by minimizing a cost function between the measurement data and a model predicted pose state.

In an embodiment, the on-board self-localization data comprises laser scan data, and the method further comprises extracting lidar features from the laser scan data and matching the lidar features with a local map and thereby obtaining a set of feature-map-matching coefficients, wherein the cost function depends on the set of feature-map-matching coefficients.

In an embodiment, the on-board self-localization data comprises image data, and the method further comprises extracting visual features from the image data and thereby obtaining a set of visual features, wherein the cost function depends on the set of visual features.

In an embodiment, the method further comprises the estimating the pose state of the unmanned aerial vehicle using measurement data corresponding to a sliding time window.

According to a third aspect of the present disclosure, a computer readable medium storing processor executable instructions which when executed on a processor cause the processor to carry out a method as set out above is provided.

BRIEF DESCRIPTION OF THE DRAWINGS

In the following, embodiments of the present invention will be described as non-limiting examples with reference to the accompanying drawings in which:

FIG. 5 is a flowchart showing a localization method for an unmanned aerial vehicle according to an embodiment of the present invention;

FIG. 6 is a flow chart showing the workflow in a localization method for an unmanned aerial vehicle according to an embodiment of the present invention;

FIG. 11 is a table showing position estimates of the anchors in the flight tests;

FIG. 12 is a table showing a comparison of absolute trajectory error over building inspection datasets.

DETAILED DESCRIPTION

Figure 1:
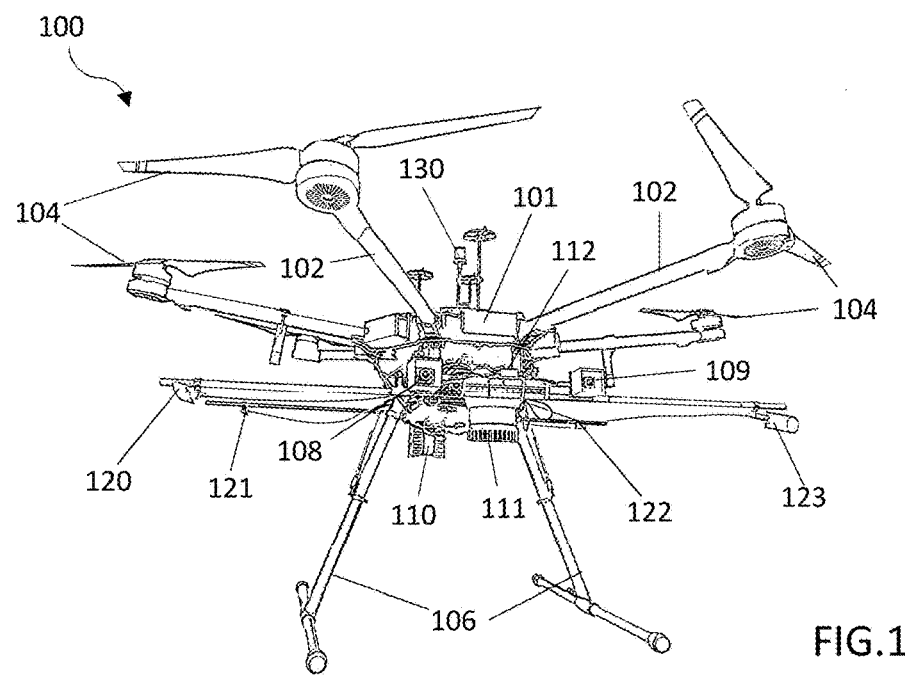
FIG. 1 shows an unmanned aerial vehicle according to an embodiment of the present invention.

FIG. 1 shows an unmanned aerial vehicle according to an embodiment of the present invention. The unmanned aerial vehicle 100 comprises a body 101 from which six arms 102 extend. A rotor 104 is mounted on each of the arms 102. A landing gear 106 extends downward from the body 101. Two cameras are mounted on the body: a left camera 108 and a right camera 109 which both face forward. A vertical lidar sensor 110 and a horizontal lidar sensor 111 are mounted on the body 101. Each of the vertical lidar sensor 110 and the horizontal lidar sensor 111 comprise a laser and a receiver and operate to determine the range of objects by measuring the return time for reflected light to return to the receiver. The vertical lidar sensor 110 is arranged to carry out ranging in vertical directions and the horizontal lidar sensor 111 is arranged to carryout ranging in horizontal directions. An inertial measurement unit (IMU) 112 is arranged on the body 101. The inertial measurement unit 112 comprises gyroscopes and accelerometers and is configured to detect linear acceleration and angular velocity of the unmanned aerial vehicle.

Four ultra-wide band antenna nodes are arranged on arms extending from the body 101 of the unmanned aerial vehicle. As shown in FIG. 1, a first ultra-wide band antenna node 120 is arrange on an arm extending to the front left of the body 101, a second ultra-wide band antenna node 121 is arranged on an arm extending to the rear left of the body 101, a third ultra-wide band antenna node 122 is arrange on an arm extending to the rear right of the body 101 and a fourth ultra-wide band antenna node 123 is arranged on an arm extending to the front right of the body 101. The UWB signal has a frequency band from 3.1 GHz to 4.8 GHz. Ranging measurement is carried out by a two-way time-of-flight technique. The network is synchronized via a Time-Division Multiple Access technique where ranging measurements are scheduled on a slot map.

In the unmanned aerial vehicle shown in FIG. 1, a crystal prism 130 which acts as a ground truth tracking point is mounted on top of the body 101. The crystal prism 130 is used to verify the localization scheme in experiments such as those described below with reference to FIG. 13A to FIG. 13D and is not used as part of the localization schemes. Thus, the localization schemes described herein would operate without the crystal prism 130.

The ultra-wide band antenna nodes are configured to send and receive signals from anchor nodes located at fixed locations in the environment in which the unmanned aerial vehicle operates. By sending and receiving signals from these anchor nodes, the location and orientation of the unmanned aerial vehicle can be estimated.

Figure 2:
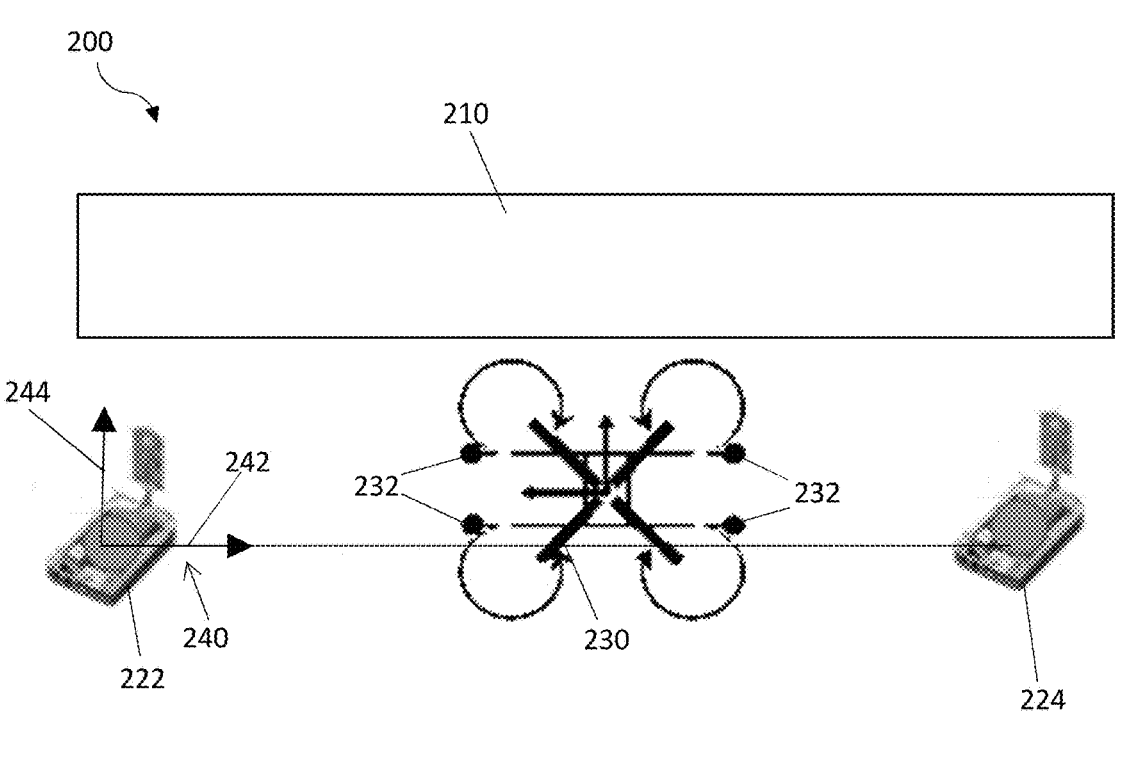
FIG. 2 shows the deployment of anchor nodes for use with an unmanned aerial vehicle according to an embodiment of the present invention.

FIG. 2 shows the deployment of anchor nodes in an environment for use with an unmanned aerial vehicle according to an embodiment of the present invention. As shown in FIG. 2 three ultra-wide band (UWB) ground nodes or anchor nodes are arranged in an environment 200 around a structure 210 under inspection. A first anchor node 222, a second anchor node 224 and a third anchor node 226 are arranged in the environment 200. The UAV 230 having four UWB ranging nodes 232 flies in the environment 200. A world frame 240 is defined having an x-axis 242 in the direction from the first anchor node 222 towards the second anchor node 224 and a y-axis in the direction towards the structure 210 under inspection. A z-axis is defined to point upwards by the right-hand rule. The third anchor node 226 is positioned on the −y half plane. In this scheme by having the +x direction point from one node to another, together with the preferred choice of z pointing upwards, we can easily define a fixed reference frame that can be easily aligned with the environment we wish to conduct the UAV operation in. Additionally, the three anchor nodes are arranged substantially in a horizonal plane and the four UWB ranging nodes 232 on the UAV 230 are also arranged in a horizontal plane.

It is noted that the scheme shown in FIG. 2 may be extended to more than three anchor nodes, however, three are shown for simplicity as this is the minimum number required for localization of the UAV.

Figures 3, 4:
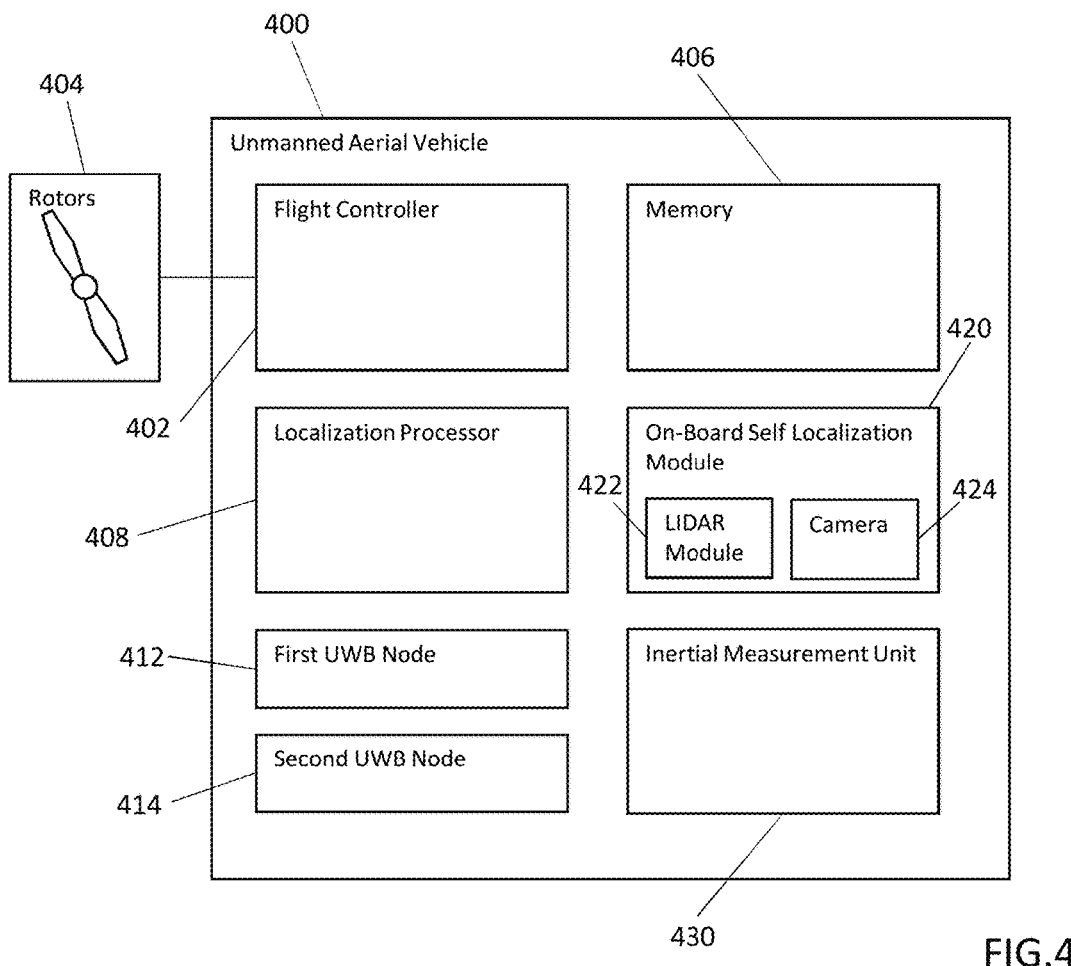
FIG. 3 is a table showing communication slots for anchor nodes used in embodiments of the present invention.
FIG. 4 is a block diagram showing an unmanned aerial vehicle according to an embodiment of the present invention.

FIG. 3 is a table showing communication slots for anchor nodes used in embodiments of the present invention. FIG. 3 shows the slot map designed for one anchor node, for example, the first anchor node 222 having ID101. Notice that grayed slots where ranging between the anchors are scheduled (i.e. slots 0, 7, 14) are the same for all anchors. By configuring the UWB to echo the last range, all nodes in the network should be able to obtain the distances among the three nodes ID100, ID101, ID102 after 2 cycles and calculate the corresponding coordinates x1, x2, y2 of anchor ID101 and ID102, assuming that the plane made by the three anchors are parallel with the x-y plane of the coordinates system. In this scheme, while ranging between the UAV-mounted nodes and the anchor nodes are different across the slot maps, ranging between the anchors are the same for all slot maps. In this case, slot 0, 7 and 14 are used to conduct ranging between the anchor nodes. By configuring the anchor nodes to echo their last range, all other nodes can receive a message containing the distance between anchors. These distances can then be used to calculate the coordinates of the ground node. The important issue here is to design such a set of slot maps with minimal number of nodes needed for ranging between the anchors (thus allowing more time for UAV to range to the anchors), yet still ensure enough range measurements to efficiently calculate the coordinates of the anchors.

FIG. 4 is a block diagram showing an unmanned aerial vehicle according to an embodiment of the present invention. The unmanned aerial vehicle 400 comprises a flight controller 402 which is controls rotors 404 of the unmanned aerial vehicle 400. The unmanned aerial vehicle 400 further comprises a memory 406, a localization processor 408, a first ultra-wide band node 412, a second ultra-wide band node 414, an on-board self-localization module 420 and an inertial measurement unit 430. The memory 406 may store flight plans which are executed by the flight controller 402 in order to carry out an inspection or other task. The memory may also store images, video or other data captured by sensors of the unmanned aerial vehicle during a task. The localization processor 408 executes methods according to embodiments of the present invention to determine the location of the unmanned aerial vehicle using information captured by sensors on the unmanned aerial vehicle. The first ultra-wide band node 412, and the second ultra-wide band node 414 are ultra-wide band antennas which determine the range to anchor ultra-wide band nodes arranged in the environment. The on-board self-localization module 420 comprises a lidar module 422 and a camera 424. The lidar module 422 comprises a laser and a receiver and operate to determine the range of objects by measuring the return time for reflected light to return to the receiver. The inertial measurement unit 430 comprises gyroscopes and accelerometers and is configured to detect linear acceleration and angular velocity of the unmanned aerial vehicle 400.

The flight controller 402, the memory 406 and the localization processor 408 may be implemented as a small form factor computer having a processor and a memory storing computer executable instructions which are executed on the processor to carry out the methods described in this disclosure. The memory 406 may be referred to in some contexts as computer readable storage media and/or non-transitory computer readable media. Alternatively, while a software implementation of the computer program modules is described herein, these may alternatively be implemented as one or more hardware modules (such as field-programmable gate array(s) or application-specific integrated circuit(s)) comprising circuitry which implements equivalent functionality to that implemented in software.

FIG. 5 is a flowchart showing a localization method for an unmanned aerial vehicle according to an embodiment of the present invention. The method 500 shown in FIG. 5 is carried out by the unmanned aerial vehicle 400 shown in FIG. 4.

In step 502, the first ultra-wide band node 412 and the second ultra-wide band node 414 of the unmanned aerial vehicle 400 receive signals from anchor nodes. From these signal, the localization processor 408 determines the range to each of the anchor nodes.

In step 504, the localization processor 408 of the unmanned aerial vehicle 400 estimates the pose state of the unmanned aerial vehicle. The pose state comprises the location and orientation of the unmanned aerial vehicle relative to the anchor nodes in the environment.

FIG. 6 is a flow chart showing the workflow in a localization method for an unmanned aerial vehicle according to an embodiment of the present invention. The method 600 shown in FIG. 6 is carried out by the unmanned aerial vehicle 400 shown in FIG. 4.

As shown in FIG. 6, the inputs to the method are ultra-wide band (UWB) data 610, inertial measurement unit (IMU) data 620, pointclouds 630 which are generated by the lidar module 422 of the unmanned aerial vehicle 400, and images 650 which are generated by the camera 424 of the unmanned aerial vehicle 400. The method 600 also uses UWB measurements $$\{\mathcal{U}_m^i\}$$

and pose predictions $\hat{X}_m$, from previous stages in key frame management 640.

As described above with reference to FIG. 2, the UWB ranging and communication 602 network is employed to gather the distance between the anchors, after they have been deployed in the field. These distances will be then used to calculate the position of the anchors by using an anchor self-localization 604 algorithm. Once the anchors' positions 605 have been calculated, they will be associated with the UWB measurements 603. Thus, a UWB measurement which makes up the UWB data 610 consists of three pieces of information, first is the position of the UWB node in the UAV's body frame, second is the UWB anchor position in the chosen world frame, and third is the distance between these two UWB nodes.

After the self-localization stage, UWB, IMU and OSL data will go through multiple stages before they are fused together in the Optimization-based Sensor Fusion (OSF) algorithm. The system is synchronized by the lidar messages, whose time stamps are used to determine the time steps from time $t_w$ to $t_k$. This synchronization process is described in more detail below with reference to FIG. 7.

The UWB data 610 is subjected to some preliminary checks 612 to eliminate bad measurements. These checks include comparing the measurement's signal over noise ratio (SNR), leading-edge-detection quality, and rate-of-change with some user-defined thresholds, etc. Only those that meet these thresholds will be passed to the buffer in a bundling 614 stage for subsequent stages. UWB measurements that arrive in the interval $(t_{m-1}, t_m]$, $w+1 \le m \le k$ are grouped into a set $$\{\mathcal{U}_m^i\}.$$

Finally, this set will be put into a final outlier check 616 to see if any measurement in it is an outlier. This is done by comparing the measurement with the IMU-predicted range value. As shown in FIG. 6, the IMU propagated state 629 determined in by the pose prediction 628 algorithm is used in the outlier check 616.

Figure 7:
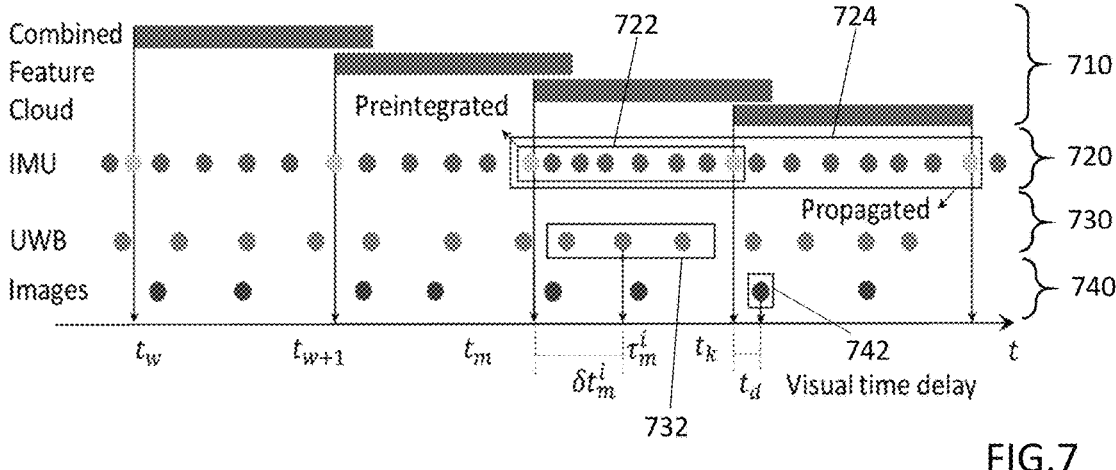
FIG. 7 is a timing diagram showing a sliding window synchronization scheme used in embodiments of the present invention.

FIG. 7 is a timing diagram showing a sliding window synchronization scheme used in embodiments of the present invention. As shown in FIG. 7, The system is synchronized by the lidar messages 710, whose time stamps are used to determine the time steps from time $t_w$ to $t_k$. The IMU data 720, the UWB data 730 and the image data 740 is then allocated into the sliding windows according to the timing relative to the lidar messages 710. IMU data from a subsequent frame 722 is pre-integrated and used in the processing of earlier frames. IMU data from one or more frames 724 is propagated and used to compensate for motion distortion. A group of UWB data points 732 in a frame may be defined having a timestamp $$\tau_m^i.$$

An image 742 may be defined as having a visual time delay $t_d$ with respect to the timing of the corresponding frame defined by the lidar messages 710.

Returning now to FIG. 6, the IMU data 620 is subjected to bundling 622 to arrange the data into frames as described above with reference to FIG. 7, and pre-integration before being input into a local optimization algorithm 626. The local optimization algorithm 626 generates a pose prediction 628.

For the lidar point cloud data 630, the plane and edge features are then extracted using the common smoothness criteria of LOAM systems in a feature extraction 632 step. The motion distortion in these features is compensated by the IMU-propagated states, and then transform to the inertial frame in the transform and deskew step 634. Hence, these features are then matched with the local map 642 built from marginalized point clouds in an association 644 step to obtain the set of feature-map-matching (FMM) coefficients $$\{\mathcal{L}_m^i\},$$

which are used to create the lidar factors in the final cost function calculated in the local optimization algorithm 626.

The feature-map-matching coefficients are calculated using the following algorithm:

---

Input: $\mathcal{F}_m = (\mathcal{F}_m^p, \mathcal{F}_m^e)$, $\mathcal{M}_w = (\mathcal{M}_w^p, \mathcal{M}_w^e)$, $\hat{T}_m$ Output: $C_m \triangleq \{\mathcal{L}_m^1, \mathcal{L}_m^2, \dots\}$, $\mathcal{L}_m^i = ({}^m f^i, n^i, c^i)$.

for each $f \in \mathcal{F}_m^p$ do.

Compute ${}^m f^i$ from $f^i$ and $\hat{T}_m$;

if $f \in \mathcal{F}_m^p$ then

Find $\mathcal{N}_f = KNN(f, \mathcal{M}_w^p)$;

Find $\bar{n} = \mathrm{argmin}_n \sum_{x \in \mathcal{N}_f} \|n^\top x + 1\|^2$ ;

Compute $s = \left[1 - 0.9 \dfrac{|n^\top + 1|}{\|n\|\|f\|}\right]$ and $g = \dfrac{s}{\|n\|}$;

If $s > 0.1$, add $({}^m f^i, gn, g)$ to $C_m$;

else if $f \in \mathcal{F}_m^p$ then

Find the set $\mathcal{N}_f = KNN(f, \mathcal{M}_w^p)$, and its centroid $\bar{p} = \dfrac{1}{|\mathcal{N}_f|} \sum_{x \in \mathcal{N}_f} x$;

Compute: $A \triangleq \dfrac{1}{|\mathcal{N}_f|} \sum_{x \in \mathcal{N}_f} (x - \bar{p})(x - \bar{p})^\top$;

Find the eigenvector $v_{max}$ corresponding to the largest eigenvalue of $A$;
    Compute: $x_0 = f$, $x_1 = \bar{p} + 0.1 v_{max}$, $x_2 = \bar{p} - 0.1 v_{max}$, $v_{01} = x_0 - x_1$, $v_{02} = x_0 - x_2$, $v_{12} = x_1 - x_2$;
    Compute: $n_1 = v_{12} \times (v_{10} \times v_{02})$, $n_1 \leftarrow n_1/\|n_1\|$, $n_2 = v_{12} \times n_1$;

Compute: $f_\perp = f - (n_1 n_1^\top) v_{01}$;

Compute: $c_1 = -n_1^\top f_\perp$ and $c_2 = -n_2^T f_\perp$;

---

-continued

---

Compute: $c_1 = -n_1^T f_\perp$ and $c_2 = -n_2^T f_\perp$;

Compute: $s = \left[1 - 0.9 \dfrac{\|v_{01} \times v_{02}\|}{\|v_{12}\|}\right]$, $g = s/2$;

If $s > 0.1$, add $({}^m f^i, gn_1, gc_1)$ and $({}^m f^i, gn_2, gc_2)$ to $C_m$;

---

For the camera images 650, the binary robust independent elementary features (BRIEF features) are extracted in a feature extraction sync step 652 and then use the latest pose estimates to triangulate these features for depth initialization in a triangulation step 645. Hence, we can obtain a set of coefficients $$\{\mathcal{V}_{ab}^i\}$$

which can be used to construct the visual factors in the final cost functions used in the local optimization algorithm 626. Specifically, $$\mathcal{V}_{ab}^i$$

is defined as:

$$\mathcal{V}_{ab}^i \triangleq ({}^a\mathcal{Z}^i, {}^b\mathcal{Z}^i), \ \mathcal{Z}_a^i \triangleq \pi({}^a f^i) = \frac{1}{z_a^i}(x_a^i, y_a^i, z_a^i) \triangleq \lambda^i(x_a^i, y_a^i, z_a^i),$$

$$\mathcal{Z}_b^i = \pi({}^b f^i) = \frac{1}{z_b^i}(x_b^i, y_b^i, z_b^i),$$

where ${}^a\mathcal{Z}^i$, ${}^b\mathcal{Z}^i$ are the projected coordinates of the feature in camera frames a and b, ${}^a f^i$, ${}^b f^i$ are the feature's 3D coordinates w.r.t camera frames a and b, $\lambda^i$ is the inverse depth of visual feature i, which is only associated with the camera frame that first observes the feature.

The cost function will be then optimized to provide the estimate of the robot states in the sliding windows. The latest state estimate in the sliding windows will be combined with the latest IMU measurements in the buffer, which are leftovers from the last extraction plus the newly arrived during the optimization process, to calculate the high-rate pose estimate. This high-rate pose estimate is also used to perform the outlier check on the UWB measurements that was mentioned earlier.

After the optimization has been completed, the sliding window will be slid forward, the oldest state estimate and its associated measurements will be abandoned, and a new time step will be registered when the conditions mentioned earlier are met.

Figure 8:
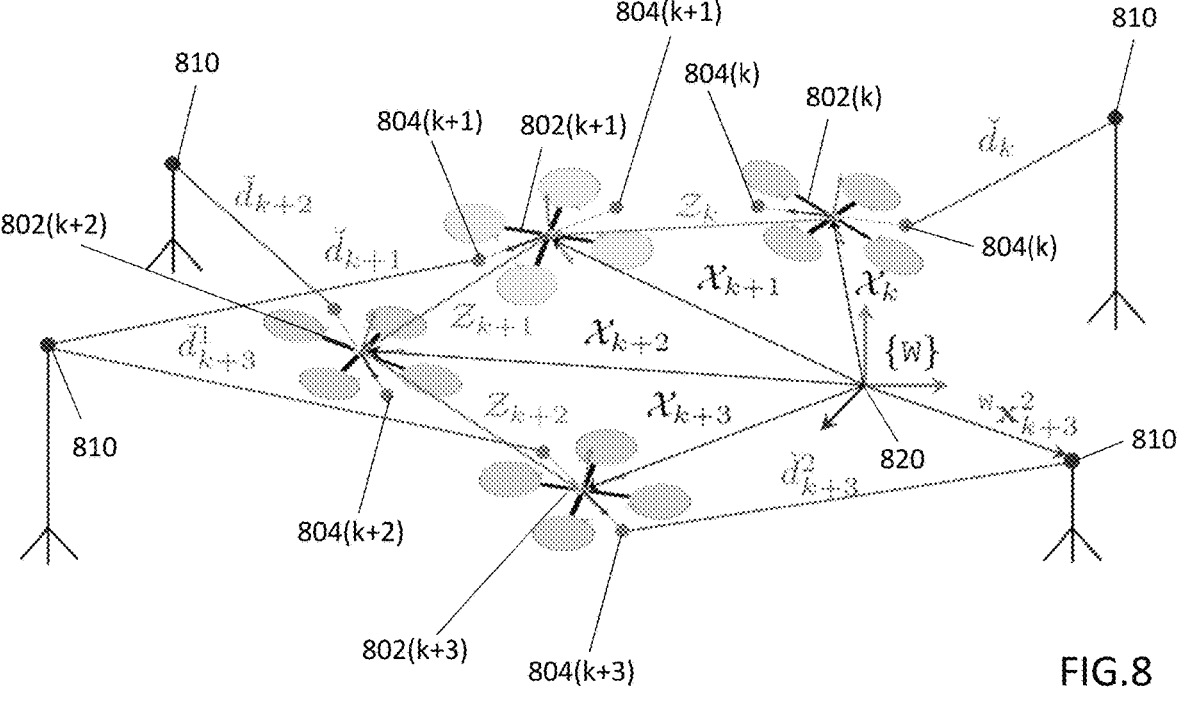
FIG. 8 shows multiple poses of an unmanned aerial vehicle and the coupling of these poses with available observations.

FIG. 8 shows multiple poses of an unmanned aerial vehicle and the coupling of these poses with available observations. As shown in FIG. 8, the unmanned aerial vehicle 802 having UWB nodes 804 moves through a series of positions which are labelled k, k+1, k+2 and k+3. Three anchor UWB nodes 810 are arranged in the environment. The pose of the unmanned aerial vehicle 802 is expressed relative to axes 820. As shown in FIG. 8, the pose of the UAV 802 at position k is $\mathcal{X}_k$, the poses at positions k+1, k+2 and k+3 are $\mathcal{X}_{k+1}$, $\mathcal{X}_{k+2}$ and $\mathcal{X}_{k+3}$ respectively. The IMU measurements between the positions are $\mathcal{Z}_k$, $\mathcal{Z}_{k+1}$ and $\mathcal{Z}_{k+2}$. The UWB measurements between the UWB nodes 802 of the UAV and the anchor nodes are expressed as $$\vec{d}_{k+3}^{\,1}$$

where the superscript number indicates a label of the anchor node.

We denote all of the state estimates on the sliding window at time $t_k$ as $\mathcal{X}_k$ as follows:

$$\hat{\mathcal{T}}_k = \left(\hat{\mathcal{X}}_w, \ldots, \hat{\mathcal{X}}_k\right), \hat{\mathcal{X}}_m = \left(\hat{q}_m, \hat{p}_m, \hat{v}_m, \hat{b}_m^\omega, \hat{b}_m^a\right) \in SE(3) \times \mathbb{R}^{12}, \tag{3}$$

$$\hat{\Lambda}_k = \left(\hat{\lambda}^1, \hat{\lambda}^2, \ldots \hat{\lambda}^{N_k^\nu}\right) \in \mathbb{R}^{N_k^\nu}.$$

where $\hat{q}_k$ is the orientation quaternion estimate, $\hat{p}_k$ and $\hat{v}_k$ are the robot's position and velocity estimates w.r.t the world frame, $$\hat{b}_k^\omega$$

and $$\hat{b}_k^a$$

are the estimates of the gyroscope and accelerometer biases of the IMU, $\hat{\lambda}^1, \hat{\lambda}^2, \ldots$ $$\hat{\lambda}^{N_k^\nu}$$

are the estimates of the inverse depth of $$N_k^\nu.$$

visual features that are tracked in the sliding window.

Hence, we can construct a cost function based on the observations from UWB, IMU and OSL measurements. The cost function can be constructed at each time step $t_{k+M}$ as follows:

$$f(\hat{\mathcal{T}}_k, \hat{\Lambda}_k) \triangleq \sum_{m=w+1}^{k} \left\| r_{\mathcal{J}}\left(\hat{\mathcal{X}}_{m-1}, \hat{\mathcal{X}}_m, \mathcal{J}_m\right) \right\|_{P_{\mathcal{J}_m}^{-1}}^2 + \sum_{m=w}^{k}\sum_{i=1}^{N_{\mathcal{L}}^m} \left\| r_{\mathcal{L}}\left(\hat{\mathcal{X}}_m, \mathcal{L}_m^i\right) \right\|_{P_{\mathcal{L}_m^i}^{-1}}^2 +$$

$$\sum_{m=w}^{k}\sum_{i=1}^{N_{\mathcal{U}}^m} \left\| r_{\mathcal{U}}\left(\hat{\mathcal{X}}_{m-1}, \hat{\mathcal{X}}_m, \mathcal{U}_m^i\right) \right\|_{P_{\mathcal{L}_m^i}^{-1}}^2 + \sum_{i=1}^{N_{\mathcal{V}}^k}\sum_{b \in C^i} \left\| r_{\mathcal{V}}\left(\hat{\mathcal{X}}_a, \hat{\mathcal{X}}_b, \hat{\lambda}^i, \mathcal{V}_{ab}^i\right) \right\|_{P_{\mathcal{V}_{ab}^i}^{-1}}^2$$

where $r_{\mathcal{J}}(\bullet)$, $r_{\mathcal{U}}(\bullet)$, $r_{\mathcal{L}}(\bullet)$, $r_{\mathcal{V}}(\bullet)$, $r_{\mathcal{J}}(\bullet)$ are the residuals constructed from IMU, UWB and OSL measurements $$P_{\mathcal{J}_m}, P_{\mathcal{V}_m^i}, P_{\mathcal{U}_m^i}, P_{\mathcal{L}_m^i}$$

are the covariance matrices of the measurement errors, and $$N_{\mathcal{U}}^m, N_{\mathcal{V}}^k$$

are the number of UWB measurement in the intervals. The cost function above summarizes the coupling of all the states and the observations. Once the cost function has been constructed, we can use open-source non-linear solvers such as g2o or ceres to execute the optimization.

Below, we will explain in detail the process to construct each factor in the cost function. Essentially, for each measurement, we will find an observation model that links the actual measurements with the states. Then we will calculate the residual (or loosely-speaking, the difference) between the measurement and the model-predicted value. Then, we need to derive the covariance matrix of the measurement errors, to properly apply the weightage among the factor. Finally, to facilitate real-time optimization, the Jacobians of each factor have to be analytically derived.

i. Ranging Factor:

At each time step $t_k$ we have the following observation from a UAV ranging node:

$$\mathcal{U}_m^i = \left(\vec{d}_m^{\,i}, x_m, y_m, \tau_m^i, t_{m-1}, t_m\right),$$

where $$\vec{d}_m^{\,i}$$

is the distance measurement, and $$x_m^i$$

is the position of the UWB anchor w.r.t. the world frame, and $$y_m^i$$

is the coordinate of the UWB ranging node in the body frame, $$\tau_m^i, t_{m-1}, t_m$$

are the time stamps defined in FIG. 7.

The residual of a range measurement $$\mathcal{U}_m^i$$

is calculated by taking the difference between the distance estimate $\hat{d}_m$ and the distance measurement $$\vec{d}_k : r_{\mathcal{U}}\left(\hat{\mathcal{X}}_{m-1}, \hat{\mathcal{X}}_m, \mathcal{U}_m^i\right) = \hat{d}_m - \vec{d}_m^{\,i},$$

where $\hat{d}_k$ represents the estimated distance:

$$\hat{d}_m \triangleq \left\| \hat{p}_m + \hat{R}_{m-1}\mathrm{Exp}\left(\frac{\delta t_i}{\Delta t_m}\mathrm{Log}\left(\hat{R}_{m-1}^{-1}\hat{R}_m\right)\right)y_m - \right.$$

$$\left. \frac{\Delta t_m^2 - \delta t_i^2}{2\Delta t_m}v_{m-1} - \frac{(\Delta t_m - \delta t_i)^2}{2\Delta t_m}v_m - x_m \right\|,$$

$$\Delta t_m = t_m - t_{m-1}, \delta t_m = \tau_m^i - t_{m-1}.$$

And the covariance of the measurement error is chosen as $$P_{\mathcal{U}_m^i} \equiv \sigma_{\mathcal{U}}^2,$$

ii. OSL Factors:

For lidar factors, the residual and covariance constructed from each feature's FMM coefficients $$\mathcal{L}_m^i = (f^i, n^i, c^i)$$

is defined as $$r_{\mathcal{L}}(\hat{X}, \mathcal{L}_m^i) = (n^i)^T \left[\hat{R}_m^m f^i + \hat{p}_m\right] + c^i, P_{\mathcal{L}_m^i} = \sigma_{\mathcal{L}}^2$$

For visual feature factors, the residual and covariance from each feature's observation is defined as $$P_{V_{ab}^i} = \mathrm{diag}\left(\sigma_{V_1}^2, \sigma_{V_1}^2\right)$$

iii. IMU Pre-Integration Factors:

The IMU measurements are defined as $$\check{\omega}_t = \omega_t + b_t^\omega + \eta_t^\omega,$$

$$\check{a}_t = a_t + R_t g + b_t^a + \eta_t^a,$$

$$\dot{b}_t^\omega = \eta_t^{b\omega},$$

$$\dot{b}_t^a = \eta_t^{ba},$$

where g=[0, 0, g]$^T$ is the gravitational acceleration, $$b_t^\omega, b_t^a$$

are respectively the biases of the gyroscope and the accelerometer, and $$\eta_t^\omega, \eta_t^a, \eta_t^{b\omega}, \eta_t^{ba}$$

are some zero-mean Gaussian noises, whose standard deviations are $\sigma_{\eta_\omega}$, $\sigma_{\eta_a}$, $\sigma_{\eta_{b\omega}}$, $\sigma_{\eta_{ba}}$, respectively.

Given the noisy IMU measurements ($\check{\omega}_t$, $\check{a}_t$) and some nominal bias values $$\bar{b}_k^a, \bar{b}_k^\omega,$$

we can calculate the following tuple of IMU pre-integrations:

$$\mathcal{J}_k = \left(\bar{\alpha}_{k+1}, \bar{\beta}_{k+1}, \bar{\gamma}_{k+1}\right),$$

where $$\bar{\alpha}_{k+1} \triangleq \int_{t_k}^{t_{k+1}} \int_{t_k}^{u\,k} \bar{R}_s\left(\bar{a}_s - \bar{b}_k^a\right)ds\,du$$

$$\bar{\beta}_{k+1} \triangleq \int_{t_k}^{t_{k+1}} {}^k\bar{R}_s\left(\bar{a}_s - \bar{b}_k^a\right)ds$$

$$\bar{\gamma}_{k+1} \triangleq \int_{t_k}^{t_{k+1}} \frac{1}{2}\Omega\left(\bar{\omega}_s - \bar{b}_k^\omega\right)^k \bar{q}_s ds$$

In practice, the above integration can be implemented by zero-order-hold (ZOH) or higher order methods (Runge-Kutta methods). During the period from $t_k$ to $t_{k+1}$, we have a sequence of m IMU samples ($\check{\omega}_0$, $\check{a}_0$), ($\check{\omega}_1$, $\check{a}_1$), . . . , ($\check{\omega}_{m-1}$, $\check{a}_{m-1}$). Thus, if ZOH is chosen, we use the following recursive rule to update the pre-integrated measurements:

$$\bar{\alpha}_{n+1} = \bar{\alpha}_n + \bar{\beta}_n\Delta\tau_n + \frac{1}{2}{}^k\bar{R}_n\left(\bar{a}_n - \bar{b}_k^a\right)\Delta\tau_n^2,$$

$$\bar{\beta}_{n+1} = \bar{\beta}_n + {}^k\bar{R}_n\left(\bar{a}_n - \bar{b}_k^a\right)\Delta\tau_n,$$

$$\bar{\gamma}_{n+1} = \bar{\gamma}_n \circ \left[ \begin{array}{c} \cos\left(\dfrac{\Delta\tau_n}{2}\left\|\bar{\omega}_n - \bar{b}_k^\omega\right\|\right) \\ \dfrac{\bar{\omega}_n - \bar{b}_k^\omega}{\left\|\bar{\omega}_n - \bar{b}_k^\omega\right\|}\sin\left(\dfrac{\Delta\tau_n}{2}\left\|\bar{\omega}_n - \bar{b}_k^\omega\right\|\right) \end{array} \right],$$

$$\bar{\alpha}_0 = 0, \bar{\beta}_0 = 0, \bar{\gamma}_0 = [\,1\quad 0_{1\times3}\,]^T, \text{ for } n = 0, 1, \ldots, m-1,$$

where $\tau_n$ is the time stamp of the n-th sample, $\tau_0=t_k$, $\tau_m=t_{k+1}$, and $\Delta\tau_n \triangleq \tau_{n+1}-\tau_n$.

The residual of the IMU preintegration factor is defined as follows $$r_{\mathcal{J}}\left(\hat{X}_k, \hat{X}_{k+1}, \mathcal{J}_k\right) \triangleq (r_\gamma, r_\alpha, r_\beta, r_b^\omega, r_b^a)$$

$$r_\gamma \triangleq 2vec\left(\left[ \begin{array}{c} 1 \\ -\frac{1}{2}C_\omega^k\Delta\hat{b}_k^\omega \end{array} \right] \circ \bar{\gamma}_k^{-1} \circ \hat{q}_k^{-1} \circ \hat{q}_{k+1}\right)$$

$$r_\alpha \triangleq \hat{R}_k^{-1}\left(\hat{p}_{k+1} - \hat{p}_k - \hat{v}_k\Delta t_k + \frac{1}{2}g\Delta t_k^2\right) - A_\omega^{k+1}\Delta\hat{b}_k^\omega - A_a^{k+1}\Delta\hat{b}_k^a - \bar{\alpha}_{k+1}$$

$$r_\beta \triangleq \hat{R}_k^{-1}\left(\hat{v}_{k+1} - \hat{v}_k + g\Delta t_k\right) - B_\omega^{k+1}\Delta\hat{b}_k^\omega - B_a^{k+1}\Delta\hat{b}_k^a - \bar{\beta}_k,$$

$$r_b^\omega \triangleq \hat{b}_{k+1}^\omega - \hat{b}_k^\omega,$$

$$r_b^a \triangleq \hat{b}_{k+1}^a - \hat{b}_k^a,$$

when $\Delta\hat{b}_k^\omega \triangleq \hat{b}_k^\omega - \bar{b}_k^\omega$, $\Delta\hat{b}_k^a \triangleq \hat{b}_k^a - \bar{b}_k^a$, ${}^k\hat{q}_{k+1} \triangleq \hat{q}_k^{-1} \circ \hat{q}_{k+1}$, and the Jacobians A, B, C are computed via an iterative scheme as follows:

$$\begin{cases} C_\omega^{n+1} \simeq {}^n\bar{R}_{n+1}^{-1}C_\omega^n - H_n\Delta\tau_n, \\ C_\omega^0 = 0 \end{cases}$$

-continued $$\begin{cases} B_\omega^{n+1} = B_\omega^n - \frac{1}{2}{}^k\overline{R}_n\lfloor(\overline{a}_n - \overline{b}_k^a)\rfloor_\times C_\omega^n \Delta\tau_n, \\ \qquad B_a^{n+1} = B_a^{nk}\overline{R}_n\Delta\tau_n, \\ \qquad B_\omega^0 = 0, B_a^0 = 0. \end{cases}$$

$$\begin{cases} A_\omega^{n+1} = A_\omega^n + B_\omega^n\Delta\tau_n - \frac{1}{2}{}^k\overline{R}_n\lfloor(\overline{a}_n - \overline{b}_k^a)\rfloor_\times C_\omega^n \Delta\tau_n^2, \\ \qquad A_a^{n+1} = A_a^n + B_a^n\Delta\tau_n - \frac{1}{2}{}^k\overline{R}_n\Delta\tau_n^2, \\ \qquad A_\omega^0 = 0, A_a^0 = 0 \end{cases}$$

The covariance of the IMU pre-integration errors are calculated based on a propagation scheme.

Figures 9, 10:
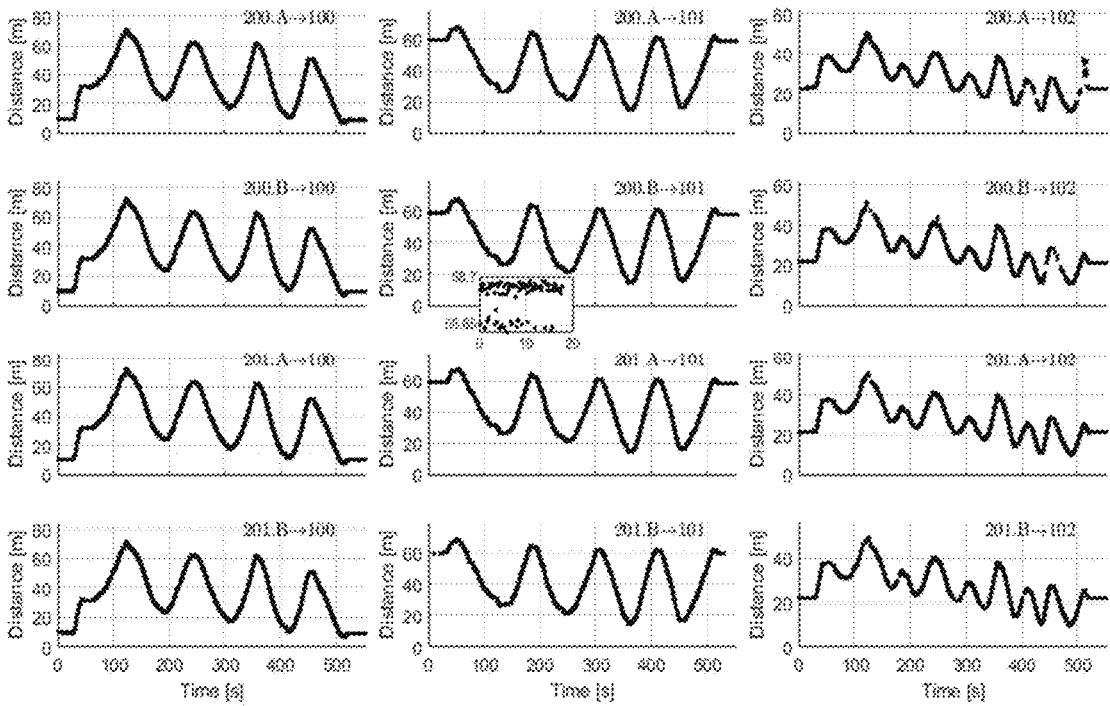
FIG. 9 is a table showing a comparison absolute trajectory error of localization methods according to embodiments of the present invention with other localization methods.
FIG. 10 shows a set of ultra-wide band measurements for a test flight of an unmanned aerial vehicle according to an embodiment of the present invention.

FIG. 9 is a table showing a comparison absolute trajectory error of localization methods according to embodiments of the present invention with other localization methods.

The methods VINS-Mono, VINS-Fusion, A-LOAM, LIO-SAM, M-LOAM are prior art methods and the methods labelled VIRAL (horiz. lidar) and VIRAL (2 lidars) correspond to localization methods according to embodiments of the using a single horizontal lidar and two lidars respectively. All algorithms are run on an NUC 10 computer with core i7 processor. Each method is slightly modified and configured for their best performance with the dataset. Since several lidar-based methods are not designed to incorporate multiple lidar inputs, we also include experiments of VIRAL using only the horizontal lidar for a fairer comparison. The Absolute Trajectory Error (ATE) result is summarized in FIG. 9. The best odometry result is highlighted in bold, and the second best is underlined. All values are in m. From this table we can clearly see that VIRAL consistently achieves better performance compared to existing methods, even when only one lidar is used.

To further verify the efficacy of the localization scheme, we develop a platform consisting of a camera system, one IMU, two LIDAR sensors, and two UWB modules. We improve the utility of the UWB sensor by using the two antennas mounted at different points on the platform, Thus, effectively we have a total of four UAV ranging nodes. The data rate of the stereo image, IMU, LIDAR 1, LIDAR 2, and UWB topics are 10 Hz, 400 Hz, 10 Hz, 10 Hz, and 69 Hz respectively. A Leica MS60 station is used to provide ground truth for the experiment. All software is run on a small form factor computer with Intel Core i7-8650U processor.

FIG. 10 shows a set of ultra-wide band measurements for a test flight of an unmanned aerial vehicle according to an embodiment of the present invention. The UWB nodes on the UAV are labelled 200.A, 200.B, 201.A and 201.B. The anchor UWB nodes are labelled 100, 101 and 102. Each of the plots shown in FIG. 10 corresponds to measurements from one of the UWB nodes on the UAV to one of the anchor nodes. From the zoomed-in part of the 200.A→101 plot, the variation of the distance is about 5 cm. We also notice some outliers in the 200.A→102 and 200.B→102 ranging measurements.

FIG. 11 is a table showing position estimates of the anchors in the flight tests. The position estimates were determined as described above with reference to FIG. 2 and FIG. 3.

FIG. 12 is a table showing a comparison of absolute trajectory error over building inspection datasets. A total of four flight tests were conducted. As having introduced earlier, since our work is meant to deliver a solution for UAV-based inspection application, the UAV's trajectory is different from those in common datasets, which are often extensive in x and y directions, but have limited movement in the z direction. In our case, for inspection purposes, the UAV only takes off and moves in a vertical plane parallel to the object. Hence the movements along the x and z directions are extensive, while movement along the y direction is minimal.

Figures 13A, 13B, 13C, 13D:
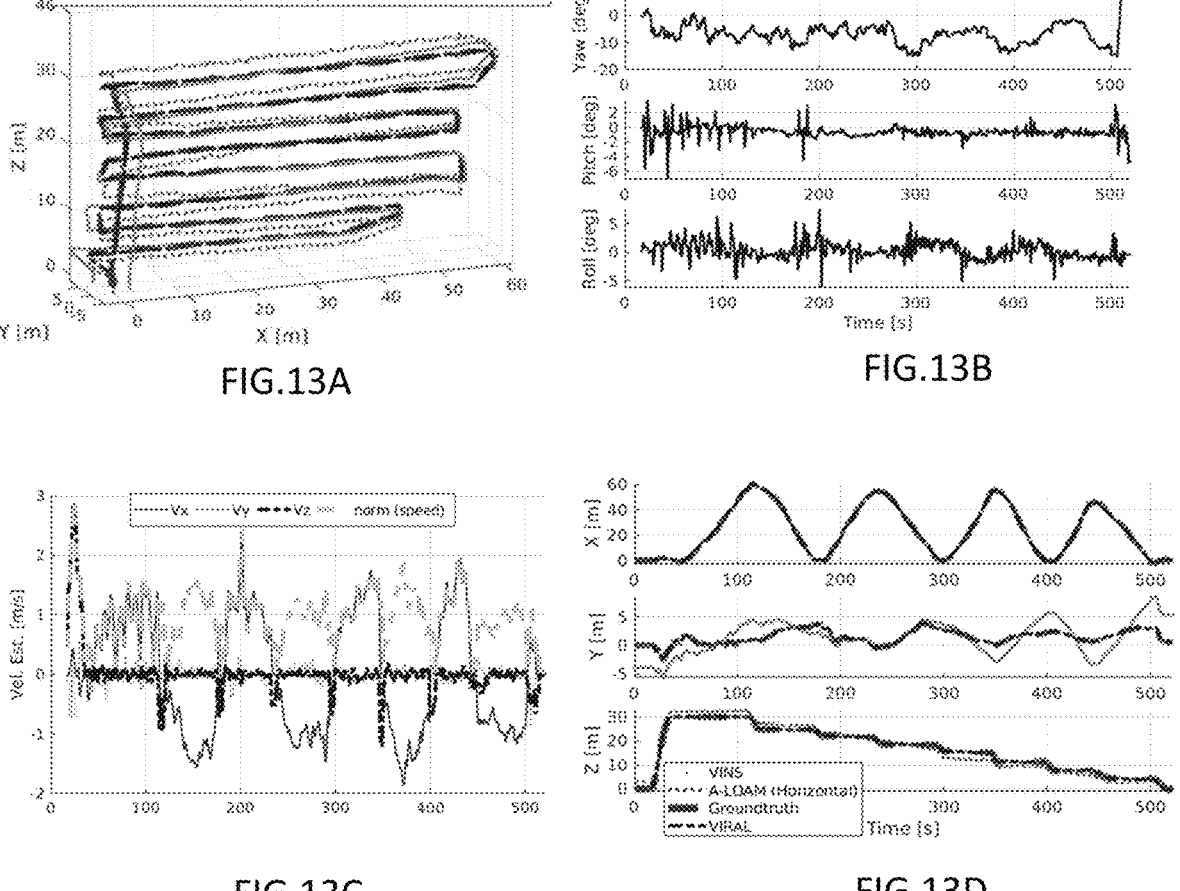
FIG. 13A to FIG. 13D show the results of a test flight experiment using an unmanned aerial vehicle according to an embodiment of the present invention.

FIG. 13A to FIG. 13D show the results of a test flight experiment. The results correspond to the flight labelled bid_01 in FIG. 11 and FIG. 12. FIG. 13A shows a 3D view of the UAV trajectory as estimated by individual OSL systems and the sensor fusion result. FIG. 13B shows Orientation estimate from the system over time. FIG. 13C shows velocity estimate from the system over time. FIG. 13D shows position estimates from the OSL systems and sensor fusion results over time. The ground truth position was obtained using a prism mounted on the UAV as shown in FIG. 1.

From the results in FIG. 13A to FIG. 13D, we can reaffirm the benefit of UWB-IMU-OSL fusion over the state-of-the-art methods. Moreover, as can be seen on FIG. 13A that while all of the OSL estimates exhibit significant drift over the operation range, our sensor fusion's estimation error remains consistent, which is the most important quality we are looking for. Besides the position error, though we don't have a ground truth for the orientation, during the flight test, the drone's heading was kept relatively unchanged, always pointing towards the object. Hence the yaw value should be around 90 degrees. Indeed, we can see that the heading estimate stays around this value in FIG. 13B.

It is anticipated that UAVs implementing the methods described above will find applications in aerial surveillance by UAVs; automated inspection operations by UAVs; and graphical modelling and structural health of 3D objects.

Whilst the foregoing description has described exemplary embodiments, it will be understood by those skilled in the art that many variations of the embodiments can be made within the scope and spirit of the present invention.

The invention claimed is:

1. An unmanned aerial vehicle comprising:
   a first ultra-wide band node;
   a second ultra-wide band node; and
   a localization processor configured to use signals received at the first ultra-wide band node and the second ultra-wide band node from a plurality of anchor nodes located within an environment to calculate an estimated global pose state of the unmanned aerial vehicle, the estimated global pose state indicating a location and orientation of the unmanned aerial vehicle relative to the plurality of anchor nodes in the environment, wherein the estimated global pose state is calculated using ultra-wide band data comprising distance measurements between ranging ultra-wide band nodes and anchor nodes from the plurality anchor nodes, positions of the anchor nodes in the environment and positions of the ranging ultra-wide band nodes on the unmanned aerial vehicle, the ranging ultra-wide band nodes being the first ultra-wide band node and the second ultra-wide band node,
   wherein the first ultra-wide band node and the second ultra-wide band node are arranged on the unmanned aerial vehicle at positions offset from one another.

2. The unmanned aerial vehicle according to claim 1, further comprising an inertial measurement unit configured to detect linear acceleration and angular velocity of the unmanned aerial vehicle and wherein the localization processor is further configured to use measurements from the inertial measurement unit to predict the pose state of the unmanned aerial vehicle.

3. The unmanned aerial vehicle according to claim 2, wherein the localization processor is further configured to pre-integrate the measurements from the inertial measurement unit to obtain a set of pre-integrated inertial measurement unit measurements and to use the set of pre-integrated inertial movement unit measurements to estimate the pose state of the unmanned aerial vehicle.

4. The unmanned aerial vehicle according to claim 2, wherein the localization processor is further configured to compare a predicted distance calculated from the pose state of the unmanned aerial vehicle determined from the inertial measurement measurements with distance predictions determined from measurements by the first ultra-wide band node and the second ultra-wide band node and thereby identify outliners in the measurements by the first ultra-wide band node and the second ultra-wide band node.

5. The unmanned aerial vehicle according to claim 2, further comprising an on-board self-localization module configured to generate on-board self-localization data.

6. The unmanned aerial vehicle according to claim 5, wherein the on-board self-localization module comprises a lidar sensor and the on-board self-localization data comprises laser scan data.

7. The unmanned aerial vehicle according to claim 5, wherein the on-board self-localization module comprises a camera and the on-board self-localization data comprises image data.

8. The unmanned aerial vehicle according to claim 5, wherein the localization processor is further configured to estimate the pose state of the unmanned aerial vehicle using measurement data comprising measurements by the first ultra-wide band node and the second ultra-wide band node, the measurements from the inertial measurement unit and the on-board self-localization data by minimizing a cost function between the measurement data and a model predicted pose state.

9. The unmanned aerial vehicle according to claim 8, wherein the on-board self-localization module comprises a lidar sensor and the on-board self-localization data comprises laser scan data and the localization processor is further configured to use the on-board self-localization data to extract lidar features from the laser scan data and match the lidar features with a local map to obtain a set of feature-map-matching coefficients, wherein the cost function depends on the set of feature-map-matching coefficients.

10. The unmanned aerial vehicle according to claim 8, wherein the on-board self-localization module comprises a camera and the on-board self-localization data comprises image data and the localization processor is further configured to use the on-board self-localization data to extract a set of visual features from the image data, wherein the cost function depends on the set of visual features.

11. The unmanned aerial vehicle according to claim 8, wherein the localization processor is further configured to estimate the pose state of the unmanned aerial vehicle using measurement data corresponding to a sliding time window.

12. A localization method for an unmanned aerial vehicle, the unmanned aerial vehicle comprising: a first ultra-wide band node; and a second ultra-wide band node, wherein the first ultra-wide band node and the second ultra-wide band node are arranged on the unmanned aerial vehicle at positions offset from one another, the method comprising:

receiving signals at the first ultra-wide band node and the second ultra-wide band node from a plurality of anchor nodes located within an environment; and calculating an estimated global pose state of the unmanned aerial vehicle, the estimated global pose state indicating a location and orientation of the unmanned aerial vehicle relative to the plurality of anchor nodes in the environment based on the signals, wherein the estimated global pose state is calculated using ultra-wide band data comprising distance measurements between ranging ultra-wide band nodes and anchor nodes from the plurality of anchor nodes, positions of the anchor nodes in the environment and positions of the ranging ultra-wide band nodes on the unmanned aerial vehicle, the ranging ultra-wide band nodes being the first ultra-wide band node and the second ultra-wide band node.

13. The localization method according to claim 12, wherein the unmanned aerial vehicle further comprises: an inertial measurement unit configured to detect linear acceleration and angular velocity of the unmanned aerial vehicle, and the method further comprises using measurements from the inertial measurement unit to predict the pose state of the unmanned aerial vehicle.

14. The localization method according to claim 13, further comprising pre-integrating the measurements from the inertial measurement unit to obtain a set of pre-integrated inertial measurement unit measurements and using the set of pre-integrated inertial measurement unit measurements to estimate the pose state of the unmanned aerial vehicle.

15. The localization method according to claim 13, further comprising comparing the predicted distance from the pose prediction of the unmanned aerial vehicle determined from measurements from the inertial measurement unit with the distance measurements by the first ultra-wide band node and the second ultra-wide band node and thereby identify outliners in the measurements by the first ultra-wide band node and the second ultra-wide band node.

16. The localization method according to claim 13, further comprising receiving on-board self-localization data generated by on-board self-localization module of the unmanned aerial vehicle.

17. The localization method according to claim 16, further comprising estimating the pose state of the unmanned aerial vehicle using measurement data comprising measurements by the first ultra-wide band node and the second ultra-wide band node, the measurements from the inertial measurement unit and the on-board self-localization data by minimizing a cost function between the measurement data and a model predicted pose state.

18. The localization method according to claim 17, wherein the on-board self-localization data comprises laser scan data, and the method further comprises extracting lidar features from the laser scan data and matching the lidar features with a local map and thereby obtaining a set of feature-map-matching coefficients, wherein the cost function depends on the set of feature-map-matching coefficients.

19. The localization method according to claim 17, wherein the on-board self-localization data comprises image data, and the method further comprises extracting visual features from the image data and thereby obtaining a set of visual features, wherein the cost function depends on the set of visual features.

20. A non-transitory computer readable medium storing processor executable instructions which when executed on a processor cause the processor to carry out the localization method according to claim 12.

* * * * *